United States Patent [19]

Trombley

[11] Patent Number: 4,706,628
[45] Date of Patent: Nov. 17, 1987

[54] ENGINE COMBUSTION CONTROL RESPONSIVE TO LOCATION AND MAGNITUDE OF PEAK COMBUSTION PRESSURE

[75] Inventor: Douglas E. Trombley, Richmond, Mich.

[73] Assignee: General Motors Corporation, Detroit, Mich.

[21] Appl. No.: 946,952

[22] Filed: Dec. 29, 1986

[51] Int. Cl.⁴ ............................................. F02D 43/00
[52] U.S. Cl. ..................................... 123/425; 123/435
[58] Field of Search .................................. 123/425, 435

[56]  References Cited

U.S. PATENT DOCUMENTS

| 3,957,023 | 5/1976 | Peterson | 123/425 |
| 3,977,373 | 8/1976 | Sand | 123/425 |
| 4,063,538 | 12/1977 | Powell et al. | 123/425 |
| 4,153,019 | 5/1979 | Laubenstein et al. | 123/425 |
| 4,391,248 | 7/1983 | Latsch | 123/425 |
| 4,406,265 | 9/1983 | Brandt et al. | 123/425 |
| 4,556,030 | 12/1985 | Aono | 123/425 |
| 4,561,401 | 12/1985 | Hata et al. | 123/486 |
| 4,598,680 | 7/1986 | Lanfer | 123/425 |
| 4,601,197 | 7/1986 | Fattic et al. | 73/117.3 |
| 4,621,603 | 11/1986 | Matekunas | 123/425 |

Primary Examiner—Andrew M. Dolinar
Attorney, Agent, or Firm—Robert M. Sigler

[57] ABSTRACT

A combustion control for an internal combustion engine adjusts ignition timing and A/F ratio to even the torque pulses of the individual cylinders as well as adjust LPP toward a desired value (DLPP). The crank angle (LPP) and magnitude (MPP) of peak combustion pressure is sensed for each cylinder and the average MPP for all cylinders (AMPP) is derived. Ignition timing is trimmed, within a first limit, in response to LPP to attempt to maintain DLPP. MPP is compared with AMPP and, if it is too low, ignition timing is trimmed in the advance direction to a second limit, which is preferably larger than the first. Only if the MPP trim of ignition timing is at maximum advance, or if MPP is too high, is A/F ratio adjusted, with MPP trim of ignition reset to zero. Thus, fuel consumption is minimized as the cylinder torques are balanced.

2 Claims, 5 Drawing Figures

ENGINE COMBUSTION CONTROL RESPONSIVE TO LOCATION AND MAGNITUDE OF PEAK COMBUSTION PRESSURE

BACKGROUND OF THE INVENTION

This invention relates to combustion control apparatus for an internal combustion engine and particularly to the use of peak combustion pressure for ignition timing control and the control of combustible mixture composition, particularly A/F ratio, for cylinder torque balancing at the lean limit of engine operation.

Location of peak pressure (LPP) ignition controls are now well known in the patent and publication prior art and are regularly used in the calibration of production engines. In such controls, the location, relative to a reference crankshaft rotational angle such as TDC, of peak or maximum combustion pressure (LPP) is sensed; and ignition timing is controlled in closed loop operation to maintain LPP at a predetermined angle, which may be constant or may vary slightly with engine speed. Patents showing such systems include Laubenstein et al U.S. Pat. No. 4,153,019, issued May 8, 1979, Brandt et al U.S. Pat. No. 4,406,265, issued Sept. 27, 1983, Karau et al U.S. Pat. No. 4,481,925, issued Nov. 13, 1984 and Fattic et al U.S. Pat. No. 4,601,197, issued July 22, 1986, all of which issued to the assignee of this invention. Other patents showing such systems include Peterson U.S. Pat. No. 3,957,023, issued May 18, 1976 and Powell et al U.S. Pat. No. 4,063,538, issued Dec. 20, 1977.

It has also been suggested that the location of peak combustion pressure LPP may be applied to the control of air/fuel ratio as well as ignition timing. The U.S. Pat. No. 4,391,248 to Latsch, issued July 5, 1983, discloses a system for controlling combustible mixture composition in response to LPP. The U.S. Pat. No. 4,561,401 to Hata et al, issued Dec. 31, 1985, discloses a system for controlling combustible mixture composition in response to LPP variations from a predetermined range.

It has further been shown, in the U.S. Pat. No. 3,977,373 to Sand, issued Aug. 31, 1976, that ignition timing or a combustible mixture composition affecting parameter such as EGR may be varied in response to the value or magnitude of peak combustion pressure in order to maintain it within predetermined limits.

It is known that, at the lean limit of engine operation, variations in the mixture of the combustible charge supplied to each combustion chamber may cause one or more of the chambers to be beyond the lean limit and thus lead to undesirable combustion or misfire. Various systems have been suggested for sensing a torque indicating parameter associated with the firing of each combustion chamber, comparing the value of this parameter with an average value for all combustion chambers and adjusting the mixture of the combustion chamber if it is too different from the average. One such parameter is derived from combustion pressure measured after combustion is complete, as described in the U.S. Pat. No. 4,621,603 to Matekunas, issued Nov. 11, 1986.

However, the Matekunas approach is based on a plurality of pressure measurements at predetermined crankshaft angles and requires a great deal of computer calculation time to derive the required values. It does not use either the location or magnitude of maximum combustion pressure and, in fact, includes no means for detecting the maximum. The goal of this invention is, rather, to add fuel control capability for torque pulse evening to an LPP ignition timing system, wherein only one combustion pressure (peak) is sampled, to optimize engine operation at the lean limit.

SUMMARY OF THE INVENTION

The apparatus of this invention maintains a separate ignition timing and combustible charge mixture for each combustion chamber. It starts with calibrated open loop means for determining base values for the ignition timing and combustible charge mixture. It maintains, for each combustion chamber, a table of LPP ignition trim values, limited in range, for adjustment of ignition timing in response to LPP. It further maintains a table of MPP ignition trim values, limited in range, for adjustment of ignition timing in response to low values of the magnitude of maximum combustion pressure (MPP). Finally, it maintains a table of A/F trim values for adjustment of combustible charge mixture in response to low or high values of the magnitude of peak combustion pressure (MPP). It derives and maintains an average of MPP (AMPP) for all combustion chambers as a basis for an allowable MPP range for individual combustion chambers.

The apparatus of this invention uses an LPP ignition trim table value in a limited LPP control of ignition timing to approach the desired LPP (DLPP). If MPP is too low, it first adjusts ignition timing, up to the limit of an MPP ignition trim table value, to further control ignition timing to boost MPP. This is based on the fact that MPP is also affected by ignition timing and, if MPP is low, ignition timing can probably be moved through a significant range with little change in LPP. The low MPP condition may thus be corrected without enriching the combustible charge mixture. If the MPP ignition trim table value is at its limit, however, the apparatus will adjust an A/F trim value to change the combustible charge mixture in the rich direction and reset the MPP ignition trim value. If MPP is too high, the apparatus will adjust the A/F trim value to change combustible charge mixture in the lean direction and reset the MPP ignition trim value. Thus, optimum lean operation is obtained with minimum fuel consumption.

Further details and advantages will be apparent from the accompanying drawings and following description of a preferred embodiment.

SUMAMRY OF THE DRAWINGS

FIG. 1 is a block diagram of an engine with a control according to the invention.

FIGS. 2(a)-2(c) show curves of LPP vs. Spark Advance for the engine of FIG. 1 in different modes of operation.

FIG. 3 is a flow chart illustrating a portion of the operation of the control computer shown in FIG. 1.

DESCRIPTION OF A PREFERRED EMBODIMENT

Figure 1:
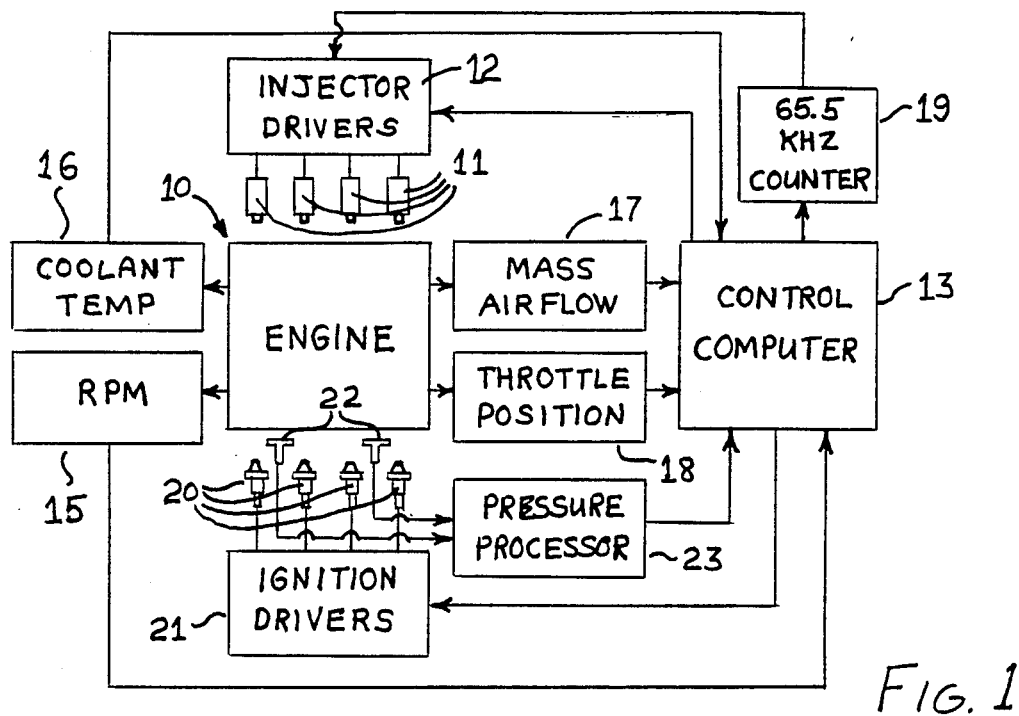

Referring to FIG. 1, an internal combustion engine 10 is of the standard type having a plurality of cylinders or combustion chambers. In this embodiment, there are four such cylinders, each provided with air through a standard intake manifold, throttle valve and intake valves, not shown, and fuel through injectors 11 driven by injector drivers 12 in response to timed, sequential signals from a control computer 13. The air and fuel forms a combustible mixture within the combustion chamber which has a composition characterized by an air/fuel (A/F) ratio and controlled by the duration of the injector pulses relative to the mass of air in the cylinder.

Control computer 13 may be a standard digital microcomputer having a microprocessor, RAM, ROM, input/output apparatus and a clock and typified by a microcomputer of the Motorola (R) 6800 series. It includes, in ROM, a stored program for operating the fuel system and other devices to be described in response to values of engine operating parameters from a plurality of sensors. An engine speed (RPM) sensor 15 may be based on a 180 tooth wheel turning with the engine harmonic balancer and a magnetic or other pickup to generate electrical pulses as it is passed by teeth of the rotating wheel. Control computer 13 or other dedicated apparatus may measure the time between consecutive RPM pulses and generate an engine speed value therefrom. In addition, the counting of the RPM pulses can be used along with absolute crankshaft reference pulses from the standard distributor, not shown, of engine 10 to indicate absolute crankshaft rotational position at any time. If the arcs of the teeth and the spaces between the teeth are equal, a pulse can be generated every degree of crankshaft rotation. A coolant temperature sensor 16 of the normal type supplies a coolant temperature signal to computer 13. A mass airflow sensor 17 generates a signal of the mass air flow rate to the cylinders; and throttle position sensor 18 generates a throttle position signal, both said signals being provided to computer 13. A 65.5 KHz counter 19 is used by computer 13 for accurate timing of the pulse duration of fuel injection pulses. Throttle position sensor 18 and coolant temperature sensor 16 are useful for controlling entry of the system into power enrichment and start/warmup operating modes, respectively, which are two modes in which lean operation is not desired.

Each cylinder of engine 10 is provided with a spark plug 20 effective, when fired, to initiate combustion of the combustible charge within the combustion chamber. Spark plugs 20 are fired by ignition drivers 21 in response to signals from computer 13. Spark plugs 20 and ignition drivers 21 may be of any standard type, with ignition drivers 21 responsive to firing pulses to fire spark plugs 20 and further effective to control the ignition dwell time.

Computer 13 includes, in ROM, stored lookup tables for fuel injection pulse width (combustion mixture composition) and ignition timing. These tables are two input lookup tables of size 9×9, for example, for a total of 81 cells each. For both tables, the input lookup variables are speed and load, with speed being the output of the RPM sensor and load being a calculated value equal to mass air flow divided by RPM. The cell contents are base fuel injection pulse durations and base ignition timing angles relative to TDC for the combustion mixture composition and ignition timing tables, respectively, which have been derived in a calibration process in engine design and are permanently stored in ROM. The base values may be modified, according to the invention, by trim values stored in additional lookup tables in RAM. These tables, which may also be of size 9×9, are of three types: LPP ignition trim; MPP ignition trim and A/F trim. These three trim tables are separately provided for each cylinder of engine 10 with the former two being used to trim ignition timing and the latter used to trim A/F ratio, in a manner to be described below.

Combustion pressure sensors 22 are provided to sense the pressure within the cylinders of engine 10 and generate a signal thereof. The sensors may be of the engine headbolt type shown in the U.S. Pat. No. 4,491,010 to Brandt et al, issued Jan. 1, 1985. If so, only two will probably be required for a four cylinder engine if placed between pairs of cylinders to be sensed as shown in FIG. 1, since they sense the combustion pressure induced strains between the engine block and head. Of course, any known sensor may be used, as long as its signal indicates clearly the magnitude of combustion pressure in the vicinity of the maximum or peak pressure. Absolute pressure sensors directly sensing combustion chamber pressure and piezoelectric force rings under spark plugs have been suggested, although each would require a separate sensor for each cylinder.

The output of the sensors is provided to a pressure signal processor 23 which detects the peak combustion pressure and signals its time of occurrence and magnitude to computer 13, which, in turn, notes and stores the crankshaft angle of its occurrence as well as the magnitude for further processing. Processor 23 may be any known circuit adapted to detect the maximum of an input signal, where the input signal is likely to have some significant high frequency noise making differentiating peak detection difficult without filtering. Some examples of apparatus capable of detecting at least the timing of true peak pressure may be seen in the aforementioned patents to Brandt et al, Karau et al or Fattic et al. Each could easily be modified by one skilled in the art to also output the magnitude of peak pressure. For example, the Karau et al apparatus contains this information on capacitor 28 at the end of the window period; and this information could be read into the computer at that time or with every consecutive new peak as the timing is read in.

Figure 3:
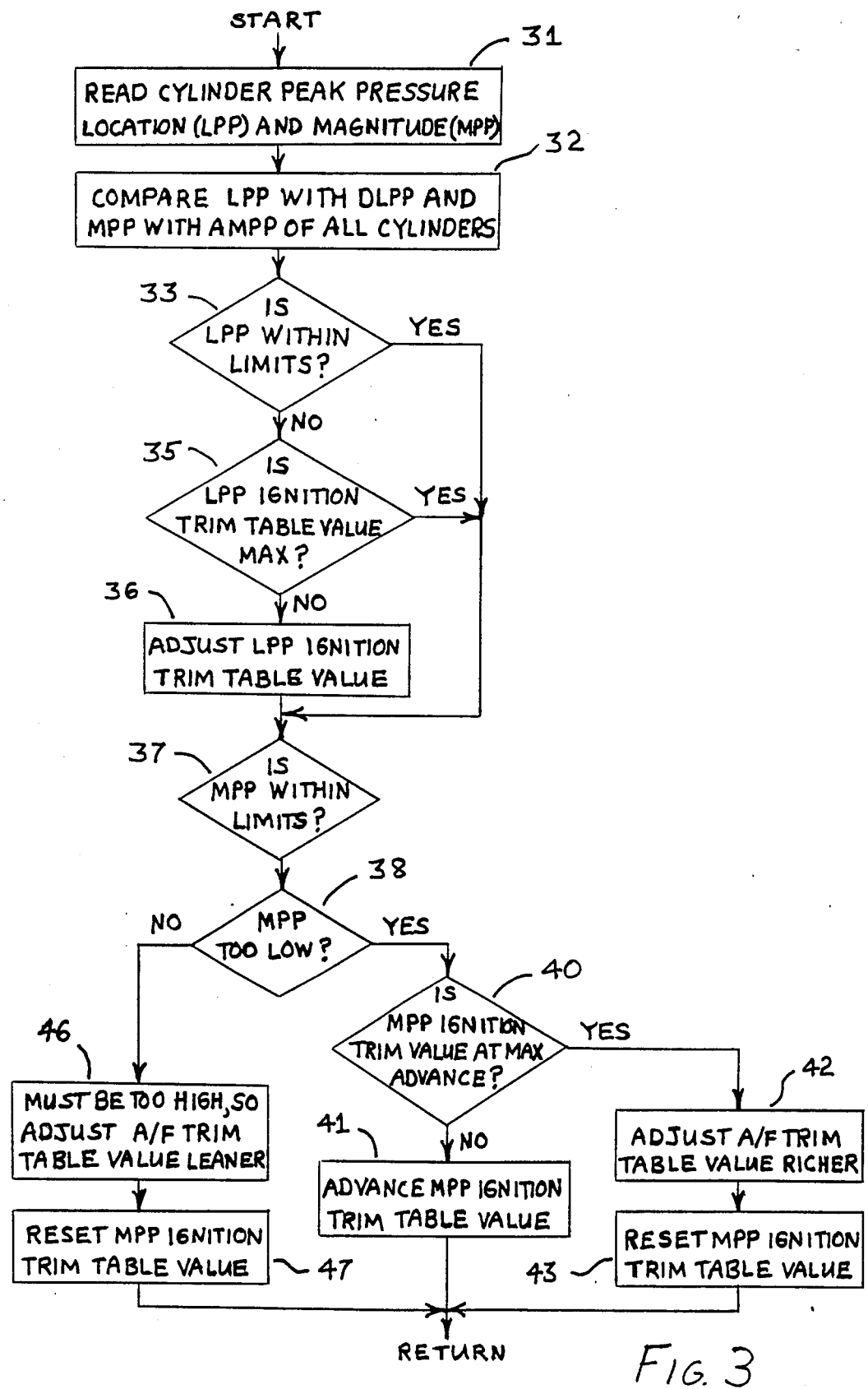

The operation of computer 13 in controlling fuel and ignition timing will now be described. The stored base and trim table values of fuel and ignition in the next firing cylinder for the current engine operating parameters are read and combined as previously described to form output fuel and ignition output control values. The fuel control value is output to the injector driver for the cylinder to control the injection pulse duration; and the ignition control value is output to the ignition driver for the cylinder to control the timing, relative to TDC, of the ignition pulse. The fuel injection and ignition are accomplished in the usual manner. Upon detection of peak combustion pressure, processor 23 derives the LPP and MPP values and causes them to be stored in the memory of computer 13, which then calls a subroutine described in the flow chart of FIG. 3. Referring to FIG. 3, the first action listed, at step 31, is to read the cylinder peak pressure location (LPP) and magnitude (MPP) values from memory. In step 32, the LPP value for the cylinder is compared with a desired LPP value (DLPP) and the MPP value for the cylinder is compared with an average MPP value (AMPP) for all cylinders. The average value may be maintained by a separate subroutine which updates the average periodically; or the average may be updated in step 32 with the receipt of each new value of MPP. The average subroutine may use any sort of digital filtering found advantageous in maintaining a stable average value.

A decision on LPP is made first. If, at decision point 33, the LPP value is outside a window about the desired value DLPP, it is considered not within limits. A typical DLPP value and allowable range for the LPP window are 14 degrees +/−1 degree. A change will be made to the value in the LPP ignition trim table corresponding to the present engine operating parameters. However, the values in the LPP ignition trim table are limited in both the advance and retard directions, typically to +/−4 degrees. At decision point 35, the appropriate value in the LPP ignition trim table for the engine operating parameters is checked to see if it is at the maximum of retard or advance. If it is not, an appropriate change is made in the table value in step 36 in direction and amount, up to the limit allowed in the table, to bring LPP back within the window about DLPP. However, if the table value is at a maximum in either direction or if no LPP correction is required, the program skips step 36 and proceeds directly to decision point 37, in which the program determines if the magnitude of peak combustion pressure (MPP) is within a limit defining window of the average for all cylinders, AMPP.

From decision point 37, if MPP is within the limiting window, the program returns with no further action. If it is outside the window, however, the program then determines, at decision point 38, if the value is too low. If MPP is too low, compared with the average for all cylinders, the program will first attempt to raise it by means of advancing ignition timing, through an adjustment to the appropriate value in the MPP ignition trim table. The values in this table are limited, although the limits are preferably greater than those of the LPP ignition trim table. A typical limit for this table is +8 degrees (advance). The program therefore determines, at decision point 40, if the MPP ignition trim table value for the engine operating parameters is at its maximum value in the advance direction. If not, then it may be possible to bring MPP back within limits by advancing ignition timing. Therefore, the program next adjusts the value in the MPP ignition trim table in the advance direction by an appropriate amount, up to the maximum, in step 41, and returns with no further action.

Figure 2A:
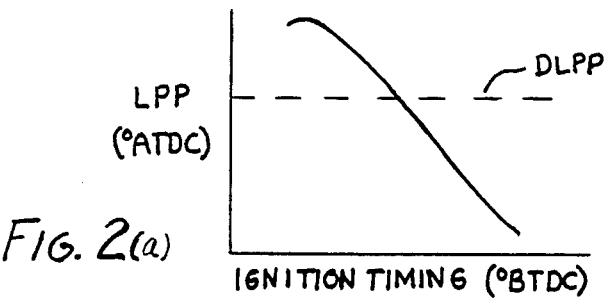
Figure 2B:
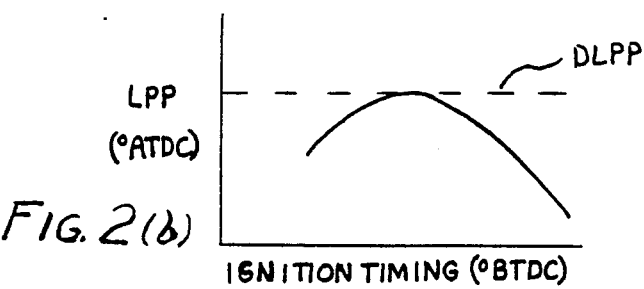
Figure 2C:
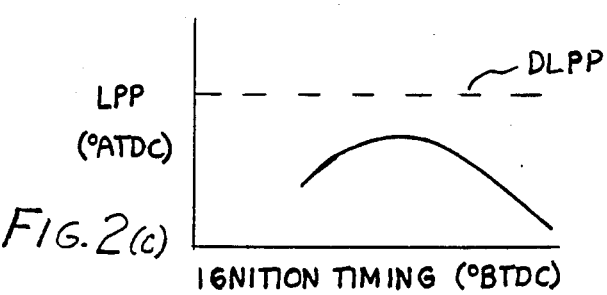

Additional explanation of the last step is appropriate at this point. FIGS. 2(a)-2(c) show the relationship between LPP and spark advance (ignition timing) for different combustion conditions. FIG. 2(a) shows a normal combustion event with its "well behaved" curve. In this case, LPP can generally be maintained with little difficulty, unless the calibration is so far off that LPP is beyond the limit of the LPP ignition trim table. In this case of normal combustion, also, one is less likely to find an MPP far out of line with the average AMPP. As the combustion mixture reaches and crosses the lean limit, however, or otherwise becomes unsupportive of good combustion, the curve begins to show a "fold-over" effect, with the left portion of the curve dropping. FIG. 2(b) shows the curve at the limit of the system's ability to maintain DLPP. FIG. 2(c) shows curve for a cylinder in which DLPP cannot be maintained. In either of the latter two cases, however, there is a maximum region near the center of the curve in which LPP is as close to DLPP as possible. The curve in this region is somewhat flat, so that LPP becomes somewhat insensitive to changes in spark advance. These are also the cases which are most likely to see a low MPP. Under these conditions, MPP may be raised by advancing ignition timing. Since LPP is about as close to DLPP as possible and will not be much affected by reasonable variations in spark advance, the spark is advanced, up to the limit of the MPP ignition trim table, to see if that is sufficient, before any changes are made to the A/F ratio. In many cases, the MPP value may be brought back up to the desired range without actually increasing fuel consumption.

If, at decision point 40, it is determined that the value from the MPP ignition trim table is at its advance limit, then further advance of this value is not allowed. Instead, the corresponding value in the A/F trim table is adjusted an appropriate amount in the rich direction in step 42; and the value in the MPP ignition trim table is reset in step 43 to a predetermined number, generally zero (or whatever number produces no trim).

If, at decision point 37, it was determined that MPP is not too low, then it follows that MPP must be too high. Therefore the program adjusts the appropriate A/F trim value an appropriate amount in the lean direction in step 46 and then, in step 47, adjusts the corresponding value in the MPP ignition trim table to zero (no trim).

It will be noted that, since ignition timing is trimmed in response to both LPP and MPP, it is theoretically possible for these two trims to fight or cancel one another. In most cases this will not happen, since actual engine operating conditions do not usually produce that result. However, in the case where this occurs, it is desired that the evening of cylinder torque output take precedence. This is why the limit of the LPP ignition trim table values is preferably smaller than the limit of the MPP ignition trim table values, with the result that the MPP ignition timing correction may, if necessary, overcome the LPP ignition timing correction.

Although there are engine operating modes, such as power enrichment or cold starting, in which lean operation is not implemented, the system described above will help optimize operation at the lean limit when such operation is desired. MPP values, and therefore output torque pulses, from individual cylinders are all brought within a predetermined range about the average with minimal fuel consumption; and LPP is maintained to a reasonable degree where it is not inconsistent with the balancing of individual cylinder torque pulses.

The embodiments of the invention in which an exclusive property or privilege is claimed are defined as follows:

1. A combustion control for an internal combustion engine of the type having a plurality of combustion chambers, means for supplying a combustible charge to and igniting the combustible charge within each combustion chamber, power output apparatus including a rotating crankshaft, and means for sensing the crankshaft angle (LPP) and magnitude (MPP) of peak combustion pressure for each combustion chamber, the combustion control comprising, in combination:

means for deriving the average magnitude of peak combustion pressure (AMPP) for all combustion chambers;

means for determining, from the sensed values of predetermined engine operating parameters, base values for the combustible charge mixture and ignition timing, relative to the rotating crankshaft, for each combustion chamber;

memory means for storing tables of LPP ignition trim values, MPP ignition trim values and A/F trim values for each combustion chamber as a function of predetermined ranges of at least some of the predetermined engine operating parameters, the LPP and MPP ignition trim values having predetermined limits;

means for comparing the sensed LPP value for each combustion chamber with a desired LPP value (DLPP) for that combustion chamber and adjusting the LPP ignition trim value for the predetermined engine operating parameters, up to the LPP ignition trim value limit, in the direction to reduce the difference therebetween at least to a predetermined allowable LPP range;

means for comparing the MPP value for each combustion chamber with the average magnitude of peak combustion pressure for all combustion chambers (AMPP) and determining whether the difference is within a predetermined allowable MPP range;

means effective, if the MPP value is too low for the allowable MPP range and the MPP ignition trim value is at the MPP ignition trim value limit in the advance direction, to adjust the A/F trim value in the rich direction and reset the MPP ignition trim value;

means effective, if the MPP value is too low for the allowable MPP range and the MPP ignition trim value is not at the MPP ignition trim value limit in the advance direction, to adjust the MPP ignition trim value in the advance direction;

means effective, if the MPP value is too high for the allowable MPP range, to adjust the A/F trim value in the lean direction and reset the MPP ignition trim value;

means for determining the combustible charge mixture for each combustion chamber from the base value thereof and the A/F trim value for the sensed predetermined engine operating parameters;

means for determining the ignition timing for each combustion chamber from the base value thereof and the LPP and MPP ignition trim values for the sensed predetermined engine operating parameters.

2. The combustion control of claim 1 in which the MPP ignition trim value limit is significantly larger than the LPP ignition trim value limit.

* * * * *